United States Patent [19]

Michel

[11] 4,196,878
[45] Apr. 8, 1980

[54] AIRCRAFT LANDING-GEAR WITH SKIDS

[75] Inventor: Pierre Michel, Aix-en Provence,, France

[73] Assignee: Societe Nationale Industrielle Aerospatiale, Paris, France

[21] Appl. No.: 853,171

[22] Filed: Nov. 21, 1977

[30] Foreign Application Priority Data

Nov. 24, 1976 [FR] France ................. 76 35369

[51] Int. Cl.² ............... B64C 25/32; B64C 25/52
[52] U.S. Cl. .................. 244/108; 9/310 A; 244/17.17; 280/28
[58] Field of Search ............... 244/100 R, 108, 109, 244/105, 17.17; 280/28; 9/310 A; 114/274, 279, 285, 291

[56] References Cited

U.S. PATENT DOCUMENTS

| 1,362,511 | 12/1920 | Roe | 244/108 |
|---|---|---|---|
| 1,420,609 | 6/1922 | Curtiss | 244/105 |
| 2,023,312 | 12/1935 | Seversky | 244/109 |
| 2,686,023 | 8/1954 | Larry | 244/108 |
| 2,958,486 | 11/1960 | Bloomfield | 244/105 |
| 3,220,670 | 11/1965 | Fuller | 244/17.17 |
| 3,387,802 | 6/1968 | Cruz | 244/108 |
| 3,507,466 | 4/1970 | LaFleur | 244/17.17 |
| 3,586,263 | 6/1971 | Payne | 244/17.17 |

FOREIGN PATENT DOCUMENTS

| 414514 | 10/1921 | Fed. Rep. of Germany | 244/108 |
| 720920 | 4/1942 | Fed. Rep. of Germany | 244/108 |

Primary Examiner—Galen L. Barefoot

[57] ABSTRACT

In rotary-wing aircraft, a landing gear having two main skids connected to the aircraft structure by two cantilevered arcuate supports. Each skid has at least one flexible element capable of flexing resiliently upon contacting the ground.

11 Claims, 3 Drawing Figures

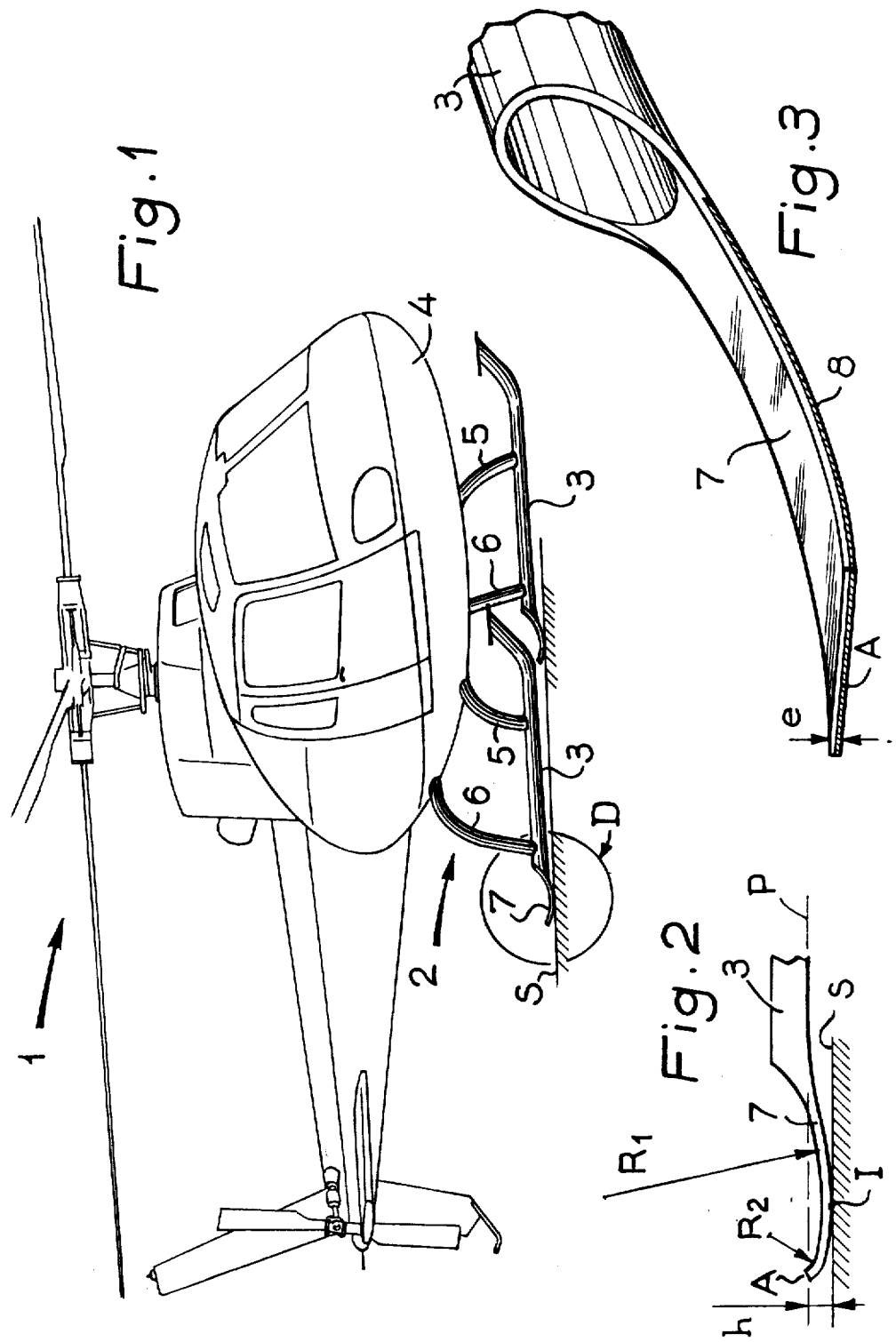

AIRCRAFT LANDING-GEAR WITH SKIDS

BACKGROUND OF THE INVENTION

The present invention relates to aircraft landing-gear and more particularly to skid-type landing-gear for rotary-wing aircraft.

Prior art skid-type landing-gear consisted basically of two main skids parallel to each other and made up of one or more sections.

Such skids are usually connected to the aircraft's structure through the use of either hinged supports, certain elements of which include damping means, or of arcuate fixed supports possessing sufficient natural flexibility to attenuate the effects of sudden hard contact with the ground.

The presence of hinged supports including for example damping means of the hydraulic or pneumatic type considerably increases the cost and complexity of the landing-gear. In addition it necessarily diminishes the reliability of the aircraft because the bulk of skid supports equipped in this manner, notably The use of simplified gear comprising two main one-piece skids connected to two flexible arcuate supports positioned in front of and behind said skids, respectively, and rigidly connected to the aircraft structure permits alleviation of the drawbacks mentioned above.

However, such a simplified landing-gear does not always fully meet certain requirements specific to this type of landing-gear primarily concerned with the behavior of the aircraft during maneuvers close to the ground. For instance, in addition to being capable of absorbing a certain amount of energy, the landing-gear, when in contact with the ground, must not give rise to the vibration phenomenon known as 'ground resonance', which consists in divergent oscillations of the whole aircraft on its landing-gear. These oscillations are excited by the alternating movements of the main-rotor blades in the rotation plane of the rotor, which movements are termed drag motion.

The onset of this ground resonance phenomenon can be greatly encouraged on a helicopter equipped with a skid landing-gear by the nature and condition of the surface of the landing or take-off area (e.g. concrete or earth surfaces, or imperfectly flat surfaces).

This being so, there can be infinity of conditions under which the landing-gear contacts the ground: contact, for example, can be made at four points, three points, or only at two points in the case of a partial landing. Certain of these conditions may not ensure clear stability of a helicopter and induce oscillations that rapidly become dangerously divergent for both the machine and its occupants.

The present invention provides for better adaptability of the skids to the nature of the surface of the landing area and thereby avoids a great many possible forms of contact liable to engender ground resonance.

SUMMARY OF THE INVENTION

The present invention provides a new solution to the problems posed by skid-type landing-gear, which solution is at once simple, highly reliable and involves no complex mechanical means.

According to the invention, a landing-gear is provided, comprising two main skids connected to the aircraft structure preferably through the use of two cantilevered arcuate supports rigidly connected to the skids and to said structure. Each skid includes at least one element capable of flexing resiliently when it contacts the ground during landing. Such flexible elements not only permits punctual contact with the landing area but also absorbs part of the loads applied to the landing-gear by cooperating with the arcuate supports of the skids.

Preferably, each skid is extended rearwardly by such a flexible element. Further, each flexible element preferably includes a lower surface offset downwardly in relation to the lower part of the associated skid, whereby the flexible element contacts the ground before the skid itself.

Each flexible element may be formed by an elastic blade which is either substantially straight and directed obliquely towards the ground relatively to the skid, or curved with its convex side facing the ground.

Further particularities of this invention are that each flexible element can either be attached to or be integral with the associated skid and that it may have, on its undersurface with which it contacts the ground, a removable lining which can be replaced in the event of excessive wear.

DESCRIPTION OF THE PREFERRED EMBODIMENT

The description which follows with reference to the accompanying non-limitative exemplary drawing will give a clear understanding of how the invention can be carried into practice.

In the drawing:

FIG. 1 illustrates in perspective a rotary-wing aircraft equipped with a skid-type landing-gear according to this invention; and FIGS. 2 and 3 show the detail D of FIG. 1 on an enlarged scale, in side elevation and in perspective respectively.

The rotary-wing aircraft or, more specifically, the helicopter 1 shown in FIG. 1 is equipped with a skid-type landing-gear generally designated by reference numeral 2. This landing-gear comprises two main mutually parallel skids 3 connected to the aircraft structure 4 by arcuate forward and rear struts 5 and 6 respectively. Struts 5 and 6 are preferably cantilevered in order to impart a degree of flexibility to the landing-gear and are rigidly connected to skids 3 on the one hand, and on the other helicopter structure 4 through the use of attachment means well-known per se (not shown).

The rear end of each skid, which skid is preferably formed by a tubular bar, includes a flexible element 7 which can be either fitted to the body of the skid with appropriate fastening means, or, as in the presently described exemplary embodiment, be integral with the body of said skid.

Flexible element 7 extends the body of the associated skid 3 rearwardly and formed as a relatively thin and substantially rectangular blade which is shaped so as to be offset downwardly below the level of the underneath surface of the skid body; in other words, the flexible element 7 projects below a reference plane P defined by the straight undersurfaces of skids 3 as seen in FIG. 2. This offset, which is associated with a curvature of radius $R_1$ and of downwardly facing convexity, permits defining, between the impact point I of blade 7 on the ground S and plane P, a difference in elevation h within the limits of which said blade deforms during landing.

Flexible blade 7 preferably has a constant thickness e; however, this thickness can change gradually, and can for instance increase gradually from the blade end A up to the blade tip where it is connected to the body of skid 3. Further, the radius $R_1$ can be extended up to an infinite value whereby to locally define for said blade a straight portion which obliques downwardly. In all cases, blade 7 preferably terminates in an upwardly curved portion of radius $R_2$.

The deformation amplitude of blade 7 within the difference in elevation h depends on the forces applied when the helicopter touches the ground S; it also depends, however, on its ability to flex, that is, on its flexural rigidity, the latter being determined in particular by the thickness e and the radii $R_1$ and $R_2$ defining the blade contour. In addition to an appropriate choice of dimensions, this rigidity can be defined with advantage by likewise operating on the modulus of elasticity by selecting a single constituent material for the blade 7, a preferred example being highduty steel, a material with a high modulus of elasticity, or a mixture or assembly, in laminated layers for example, of materials with a high modulus of elasticity and containing, say, boron, carbon, titanium or any other comparable substance.

In an alternative embodiment, the blade is in one piece and bears, on its lower surface as explicity illustrated in FIG. 3, a thin lining 8 made of metal or composite material with a high modulus of elasticity. This lining is attached by and convenient means, such as screws or bolts, to enable it to be replaced rapidly in the event of excessive wear caused notably by shocks or friction with the ground. Such replaceability when said blade is integral with the body of the skid is particularly advantageous. Alternatively, the lining 8 can be attached to a blade 7 which is in turn attached to the body of a skid 3, in which case there is the added advantage of two different ways of rapidly effecting a change in vicinity of the rear of each skid.

When it touches down, helicopter 1 is generally in a nose-up attitude; as a result, the flexible elements 7 of each skid 3, by reason of their offset position in relation to the skid body, provide two initial points of contact at the rear; then, as said elements deform, the skids in turn make at least two further points of contact in front. The presence of these two flexible elements thus makes possible, in practice, a four-point and hence very stable landing, and this irrespective of the surface condition of the landing area. Furthermore, it tends to prevent the onset of ground resonance, for what, by cooperating with the said cantilevered supports, the two flexible elements contribute effectively to the absorption of part of the loads applied to the landing-gear during a landing.

As shown in the drawings, a flexible blade 7 is normally positioned to the rear of each skid 3; alternatively, however, and depending on the helicopter utilization conditions, such blade may be placed in front of the skid, or at either end thereof, or even perpendicularly to the body of the skid, at different places thereon.

What is claimed is:

1. A landing gear for a rotary type aircraft comprising a pair of elongated skids secured to and supporting said aircraft upon the ground, and means for dampening resonance and absorbing shocks in said skid on landing, said means comprising a flexible blade arcuate at least in longitudinal cross section secured at one end to the rear end of said skids and extending rearwardly therefrom; said arcuate blade having its convex surface facing the ground and extending beneath the lower surface of said skid so as to come into contact with the ground upon landing of said aircraft 2. The landing gear according to claim 1 wherein said balde is integral with and extends from the rear of said skid.

3. The landing gear according to claim 1 wherein said blade is removably secured to and extends from the rear of said skid.

4. The landing gear according to claim 1 wherein each of said skids are secured to said aircraft by an arcuate support extending cantilevered from said aircraft.

5. The landing gear according to claim 1 wherein the outer end of said blade is turned upwardly from the ground at a radius smaller than the arcuate shape of the blade.

6. The landing gear according to claim 1, in which the flexible blade is made in one piece.

7. The landing gear according to claim 6, in which the flexible blade is made of steel.

8. The landing gear according to claim 6, in which the flexible blade is made of a composite material having a high modulus of elasticity.

9. The landing gear according to claim 1, including a removable lining secured to the lower surface of said flexible blade.

10. The landing gear according to claim 9 in which the lining is made of metal

11. The landing gear according to claim 9, in which the lining is made of a composite material having a high modulus of elasticity.

* * * * *